United States Patent [19]
Batteux et al.

[11] 4,343,778
[45] * Aug. 10, 1982

[54] PROCESS FOR THE PURIFICATION OF RESIDUAL INDUSTRIAL GASES CONTAINING SMALL QUANTITIES OF SULFUR COMPOUNDS

[75] Inventors: Jacques Batteux, Serres Morlaas; Claude Blanc; Pierre Grancher, both of Pau, all of France

[73] Assignee: Societe Nationale Elf Aquitaine, Paris, France

[*] Notice: The portion of the term of this patent subsequent to Sep. 15, 1981, has been disclaimed.

[21] Appl. No.: 232,689

[22] Filed: Feb. 9, 1981

Related U.S. Application Data

[62] Division of Ser. No. 39,384, May 15, 1979, Pat. No. 4,291,003.

[30] Foreign Application Priority Data

May 15, 1978 [FR] France ................. 78 14427

[51] Int. Cl.$^3$ ............................................. B01D 53/34
[52] U.S. Cl. ................................. 423/228; 423/229; 423/243; 423/573G
[58] Field of Search ............... 423/220, 228, 229, 210, 423/243, 573.6

[56] References Cited

U.S. PATENT DOCUMENTS

| | | | |
|---|---|---|---|
| 2,487,576 | 11/1949 | Meyers ................................ | 423/229 |
| 3,622,267 | 11/1971 | Bartholome et al. ............... | 423/229 |
| 3,864,449 | 2/1975 | Homberg et al. ............... | 423/229 X |
| 4,153,674 | 5/1979 | Verloop et al. ................ | 423/228 X |

Primary Examiner—Earl C. Thomas
Attorney, Agent, or Firm—Bacon & Thomas

[57] ABSTRACT

The invention concerns a process for the purification of residual industrial gases containing a small quantity of $H_2S$, $SO_2$, $CS_2$, COS, or possibly sulfur vapor, as well as large amounts of $H_2O$, $CO_2$ and $N_2$ in which the residual gases are first subjected to a catalytic reduction in which all the sulfur compounds are transformed into $H_2S$, and thereafter washed by an aqueous amine solution before being burnt and discarded into the atmosphere, while the aqueous amine solution is regenerated by heating and the gases given off, comprising $H_2S$ and $CO_2$, are returned to the sulfur manufacturing plant.

The process is characterized in that the temperature of the gas to be treated is permanently maintained at a level higher than the dew-point of the water contained in the gases at all points of the process, thereby insuring that substantially all $H_2O$ contained in the residual gases is discarded into the atmosphere.

4 Claims, 1 Drawing Figure

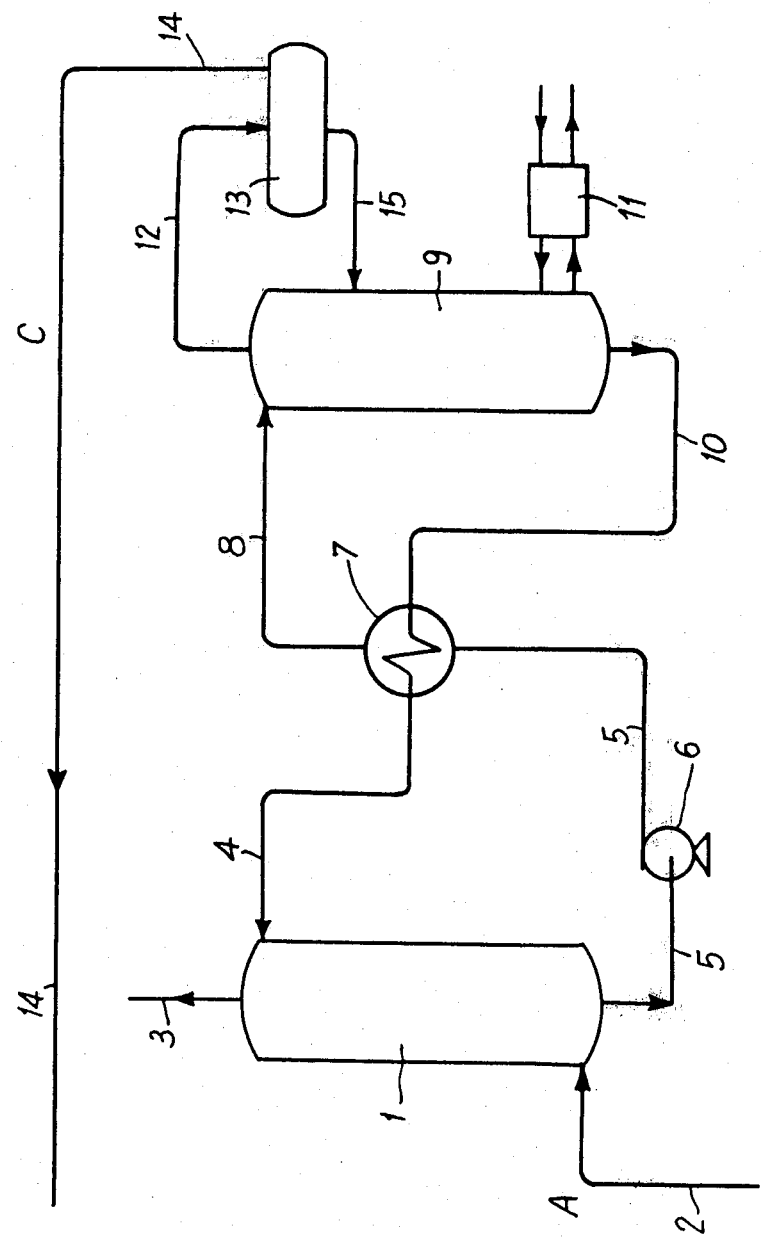

PROCESS FOR THE PURIFICATION OF RESIDUAL INDUSTRIAL GASES CONTAINING SMALL QUANTITIES OF SULFUR COMPOUNDS

This is a division, of application Ser. No. 39,384, filed May 15, 1979 now U.S. Pat. No. 4,291,003.

The invention concerns the purification of gas containing sulfur compounds and concerns more especially the purification of residual gases containing small quantities of hydrogen sulfide, sulfurous anhydride and possibly carbon oxysulfide, carbon sulfide or sulfur vapor.

The industrial residual gases, especially waste gases from oil refinery stills, from pyrites treatment ovens or from sulfur manufacturing units operating according to the Claus Process, still contain more than negligible amounts of sulfur compounds and can only be discharged into the atmosphere after large reduction of their sulfur content.

A known process for reducing the sulfur content of the residual industrial gases consists of subjecting them to catalytic reduction in order to transform into hydrogen sulfide all the sulfur compounds that they contain, followed by washing them with an aqueous amine solution before burning and discharging them into the atmosphere, while generating the amine by heating and returning the gases given off during the regeneration, comprising $H_2S$ and $CO_2$, to a sulfur manufacturing unit.

In the implementation of the known process, the absorption of the hydrogen sulfide occurs at relatively low temperatures, lower than 40° C., in order to obtain a better hydrogen sulfide/carbon dioxide separation.

The drop in temperature of the gases to be treated causes condensation of almost all the water they contain. This water may then be drawn out from the gaseous stream by being passed to the amine absorption step; this water is, however, saturated with hydrogen sulfide and must be submitted to a special treatment before being discarded or re-used. Alternately, this water may be left to penetrate in the amine absorption column in which case it accompanies the amines in the regeneration column and is finally retransformed into vapor and carried along in the hydrogen sulfide stream to be sent to the sulfur manufacturing plant. A drawing off is necessary and the $H_2S$ saturated water must also be treated before being discarded or re-used.

The aim of the invention is to create a process through which the drawback of handling water loaded with hydrogen sulfide is overcome whilst said process is simple to operate.

To this effect, the invention concerns a process for the purification of residual industrial gases containing small amounts of $H_2S$, $SO_2$, $CS_2$ and $COS$ or possibly sulfur vapor, as well as large amount of $H_2O$, $CO_2$ and $N_2$ in which the residual gases are first subjected to a catalytic reduction after which all the sulfur compounds are transformed in $H_2S$ and washed by an aqueous amine solution before being burnt and discharged into the atmosphere while the amine is regenerated through heating and the gases given off, comprising $H_2S$ and $CO_2$, are returned to the sulfur manufacturing unit, said process being characterized in that the temperature of the treated gases is maintained at a level higher than the dew point of the water contained in these gases at all points in the said unit. The process according to the invention avoids any raising of the water concentration in the amine solution and the quantities of water, as large as they are in practice, carried along by the residual industrial gases to be treated are totally evacuated from the installation according to the invention by the top of the absorption column. From there, the gases are passed to the burning apparatus, which is not hindered by the presence of water vapor and then discharged into the atmosphere.

According to the quantities of water contained in the residual gases to be treated, the absorption process with the amine solution may be operated at more or less high temperatures. According to the invention, the temperature in the absorption column is practically maintained at between 65° and 85° C., and preferably, between 70° and 80° C.

According to one characteristic of the invention, the amine solution used is formed of methyl-diethanolamine (MDEA) in solution in water at a concentration of 2 to 4 moles per liter.

The invention will be better understood in the light of the description which is going to follow and comprises examples which in no way limit the scope of the invention; the annexed flow-sheet represents the circulation of the fluids adopted for the implementation of the process.

The mixture of gas to be treated originates from a sulfur manufacturing unit operating according to the Claus process and it is passed through a catalytic hydrogenation reactor before being introduced in the bottom of an absorber 1 through a conduit 2; from said absorber 1, the mixture comes out through conduit 3 which leads it towards a chimney or a burning apparatus (which is not shown).

In the absorber 1 which may be of the perforated trays standard type, circulates counter-currently to the gas, an amine solution introduced at the top of the absorber 1 through the conduit 4 and dran out at the bottom of the absorber 1 by the conduit 5.

The amine solution is fed through a pump 6 to an exchanger 7 where it is re-heated and is then led through a conduit 8 to the top of the regeneration column 9. It comes out of it at the bottom of the column 9 through a conduit 10. The column 9 is also of a standard type and comprises at its base a reboiler 11 for heating the amine solution, thus ensuring its regeneration through the giving off of the gases it contains. These gases are given off at the top of column 9 and are led by conduit 12 to a condensor 13 before being re-cycled to the Claus Process plant through conduit 14. The condensated water in the conductor 13 is returned to column 9 through conduit 15.

The amine solution 15 leaving the bottom of column 9 through conduit 10 passes through an exchanger 7 where it re-heats the amine solution to be regenerated and it is, as shown hereunder, introduced into column 1 through conduit 4.

EXAMPLE 1

A residual gas coming from a sulfur manufacturing plant operating according to the Claus Process is first of all subjected to a catalytic hydrogenation step. Table 1 hereunder indicates in kilomoles/hours the output of the gas as well as of each of its components respectively at the following points of the installations:

A—Entrance of the gas to be treated in the absorption column

B—Exit of the treated gas to the burner or to the chimney

C—Exit of the desorbed gas to the sulfur manufacturing plant

TABLE 1

|  | A | B | C |
|---|---|---|---|
| $N_2$ | 2696 | 2696 | 0 |
| $H_2S$ | 48 | 1.2 | 46.8 |
| $H_2 + CO$ | 182 | 182 | 0 |
| $H_2O$ | 1229 | 1229 | 0 |
| $CO_2$ | 938 | 863 | 75 |
| TOTAL | 5093 | 4971.20 | 121.8 |

The gases are introduced into column 1 at a pressure of 1.2 bars and at a minimum temperature of about 70° C. They circulate at counter-current to 3 N amine solution which is introduced into the column with a flow-rate of 450 m³/hour. The quantity of hydrogen sulfide remaining in the purified gas is 250 vpm.

EXAMPLE 2

The residual gases used in this example originate from a sulfur manufacturing plant after having been submitted to a purification stage on alumina then to a catalytic reduction with the help of the reducing gases still present at the exit of the sulfur manufacturing plant. Table 2 gives the composition of the reduced gases entering the installation as well as the results of the treatment by the process according to the invention.

TABLE 2

|  | A | B | C |
|---|---|---|---|
| $N_2$ | 4550 | 4550 | 0 |
| $H_2S$ | 22 | 2.4 | 19.6 |
| $H_2 + CO$ | 65 | 65 | 0 |
| $H_2O$ | 2777 | 2777 | 0 |
| $CO_2$ | 2368 | 2179 | 189 |
| TOTAL | 9782 | 9573.4 | 208.6 |

EXAMPLE 3

The residual gases originate here also from a sulfur manufacturing plant in which has been transformed a mixture previously freed of a large percentage of its carbon dioxide. Table 3 (shown overleaf) gives the composition of the reduced gases entering the installation as well as the results of the treatment by the process according to the invention.

TABLE 3

|  | A | B | C |
|---|---|---|---|
| $N_2$ | 4102 | 4102 | 0 |
| $H_2S$ | 17 | 1.7 | 15.3 |
| $H_2 + CO$ | 93 | 93 | 0 |
| $H_2O$ | 2248 | 2248 | 0 |
| $CO_2$ | 68 | 63 | 5 |
| TOTAL | 6528 | 6507.7 | 20.3 |

What is claimed is:

1. A purification process for residual industrial gases containing small quantities of $H_2S$, $SO_2$, $CS_2$, COS or sulfur vapor, as well as large quantities of $H_2O$, $CO_2$ and $N_2$, comprising subjecting the residual gases to a catalytic reduction to transform the sulfur containing compounds in said residual gases into $H_2S$, washing the residual gases with an aqueous amine solution to form a $H_2S$ enriched aqueous amine solution and effluent gases substantially free of $H_2S$, burning said effluent gases and discharging the burnt effluent gases to the atmosphere, regenerating the $H_2S$ enriched aqueous amine solution by heating to produce gases comprising $H_2S$ and $CO_2$ and regenerated aqueous amine solution, and, returning said gases comprising $H_2S$ and $CO_2$ to a sulfur manufacturing unit; characterized in that the temperature of the gases in the process are permanently maintained at a level higher than the dew point of the water contained in the gases at each point in the process such that the $H_2O$ contained in the residual gases is discharged into the atmosphere with said burnt effluent gases.

2. The process according to claim 1, wherein the temperature of the gases in the process is maintained between 65° and 85° C.

3. The process according to claim 1, wherein the temperature of the gases in the process is maintained between 70° and 80° C.

4. The process according to claim 1, wherein said aqueous amine solution is comprised of methyl diethanolamine in an amount between 2 to 4 moles methyl diethanolamine/liter aqueous solution.

* * * * *

UNITED STATES PATENT AND TRADEMARK OFFICE
CERTIFICATE OF CORRECTION

PATENT NO. : 4,343,778
DATED : August 10, 1982
INVENTOR(S) : Jacques BATTEUX et al It is certified that error appears in the above—identified patent and that said Letters Patent is hereby corrected as shown below:

On the title page-

The Assignee should be --Societe Nationale Elf Aquitaine (Production)--.

Column 1, line 55, change "amount" to --amounts--.

Column 2, line 37, change "dran" to --drawn--;

line 50, change "conductor" to --condensor--;

line 52, delete "15".

Signed and Sealed this

Eighth Day of February 1983

[SEAL]

Attest:

GERALD J. MOSSINGHOFF

Attesting Officer    Commissioner of Patents and Trademarks